United States Patent [19]

Kawata et al.

[11] Patent Number: 4,942,187
[45] Date of Patent: Jul. 17, 1990

[54] VIBRATION-DAMPING RUBBER COMPOSITION

[75] Inventors: Takashi Kawata, Mie; Hideo Katsumata, Yokkaichi; Kenya Makino, Kuwana; Yoshishige Chikatsu, Yokkaichi, all of Japan

[73] Assignee: Japan Synthetic Rubber Company, Ltd., Tokyo, Japan

[21] Appl. No.: 158,739

[22] Filed: Feb. 23, 1988

Related U.S. Application Data

[63] Continuation-in-part of Ser. No. 130,621, Dec. 9, 1987, abandoned.

[30] Foreign Application Priority Data

Dec. 13, 1986 [JP] Japan .................................. 61-295765
Feb. 23, 1987 [JP] Japan .................................. 62-39609
Mar. 11, 1987 [JP] Japan .................................. 62-55998
Mar. 30, 1987 [JP] Japan .................................. 62-76729

[51] Int. Cl.$^5$ .................................. C08L 23/20
[52] U.S. Cl. .................................. 523/200; 524/525; 524/528; 524/530; 524/533; 524/534; 524/579; 525/194; 525/333.8
[58] Field of Search .................................. 526/348.5, 348.3; 525/333.7, 333.8, 333.9; 523/200; 524/525, 528, 530, 533, 534, 539

[56] References Cited

U.S. PATENT DOCUMENTS 3,093,624 6/1963 Gresham .................................. 526/348.5
4,152,498 5/1979 Demidova .................................. 524/579
4,264,756 4/1981 Trotter .................................. 526/348.3
4,335,225 6/1982 Collette .................................. 526/348.3
4,342,854 8/1982 Hogan .................................. 526/348.5

Primary Examiner—C. Warren Ivy
Attorney, Agent, or Firm—Oblon, Spivak, McClelland, Maier & Neustadt

[57] ABSTRACT

A vibration-damping rubber composition comprising:
(A) 100 parts by weight of at least one rubber component selected from the group consisting of (a) at least one hexene-1 type polymer selected from the group consisting of hexene-1 homopolymers and copolymers of hexene-1 and a $C_{3-20}$alpha-olefin other than hexene-1 and (b) at least one graft copolymer selected from the group consisting of a graft copolymer of a hydroxyl group-containing polysiloxane or a copolymer of hexene-1 and a silane compound represented by the general formula I:

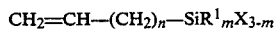

$$CH_2=CH-(CH_2)_n-SiR^1_m X_{3-m} \quad \text{I}$$

wherein n is an integer of 1 or more, m is 0 or an integer of 1-2, X is a chlorine or bromine atom, and $R^1$ is a hydrogen atom or a $C_{1-5}$alkyl group and a graft copolymer of a hydroxyl group-containing polysiloxane on a terpolymer of hexene-1, a $C_{3-20}$alpha-olefin other than hexene-1 and a silane compound represented by the general formula I,
(B) 5–150 parts by weight of a reinforcing agent,
(C) 0–50 parts by weight of a softening agent, and
(D) 0.1–5 parts by weight of a crosslinking agent. The above vibration-damping rubber composition is excellent in vibration-damping capacity, heat resistance and resistance to permanent compression set.

13 Claims, 1 Drawing Sheet

VIBRATION-DAMPING RUBBER COMPOSITION

CROSS-REFERENCE TO RELATED APPLICATION

This is a continuation-in-part of copending application Ser. No. 07-130,621 filed on Dec. 9, 1987, now abandoned.

BACKGROUND OF THE INVENTION

1. Field of the Invention

This invention relates to a vibration-damping rubber composition comprising a hexene-1 polymer or copolymer as an essential component, and more particularly, to a vibration-damping rubber composition having excellent vibration-damping capacity and excellent heat resistance.

2. Description of Prior Art

In applications such as rubber vibration insulators, particularly fields requiring damping properties, butyl rubber has heretofore been used owing to its excellent vibration-damping capacity. However, it has not been satisfactory in that its resistance to heat or compression set is inferior.

SUMMARY OF THE INVENTION

In order to solve the above-mentioned problems, the present inventors have made extensive research and found that a vibration-damping rubber composition excellent in vibration-absorbing property and resistance to heat and permanent compression set can be obtained by blending a hexene-1 homopolymer and/or a copolymer of hexene-1 and a $C_{3-20}$ alpha-olefin other than hexene-1, with other components.

An object of this invention is to provide a vibration-damping rubber composition which is superior to a butyl rubber-containing rubber composition in vibration-damping capacity and resistance to heat and compression set.

Another object of this invention is to provide a novel hexene-1 containing copolymer which can be used as one constituent of the above rubber composition.

Still another object of this invention is to provide an effective process for producing a hexene-1-containing copolymer which can be used as one constituent of the above rubber composition.

Other objects and advantages of this invention will become apparent from the following description.

According to this invention, there is provided a vibration-damping rubber composition comprising: (A) 100 parts by weight of at least one rubber component selected from the group consisting of (a) at least one polymer selected from the group consisting of hexene-1 homopolymers and copolymers of hexene-1 and a $C_{3-20}$ alphaolefin other than hexene-1 [herinafter referred to as the hexene-1 type polymer (a)] and (b) at least one graft copolymer selected from the group consisting of graft copolymers obtained by grafting a hydroxyl group-containing polysiloxane on a copolymer of hexene-1 and a silane compound represented by the general formula I:

$$CH_2=CH-(CH_2)_n-SiR^1_mX_{3-m} \qquad I$$

wherein n is an integer of 1 or more, m is 0 or an integer of 1-2, X is a chlorine or bromine atom, and $R^1$ is a hydrogen atom or a $C_{1-5}$ alkyl group, and graft copolymers obtained by grafting a hydroxyl group-containing polysiloxane siloxane on a terpolymer of hexene-1, a $C_{3-20}$ alpha-olefin other than hexene-1 and a silane compound represented by the general formula I [hereinafter referred to as the graft copolymer (b)], (B) 5-150 parts by weight of a refinforcing agent,
(C) 0-50 parts by weight of a softening agent, and
(D) 0.1-5 parts by weight of a crosslinking agent.

DETAILED DESCRIPTION OF THE INVENTION

In the hexene-1 type polymer (a) of the rubber component (A) of this invention, the hexene-1 content is preferably at least 30% by weight, more preferably at least 50% by weight, most preferably at least 65% by weight. When the hexene-1 content is too low, the resulting rubber composition has a vibration-damping capacity which is highly frequency-dependent. When the hexene-1 content is too high, the composition has a poor vibration-damping capacity in some cases. Also, in the hexene-1 type polymer (a), the weight ratio of the hexene-1 homopolymer to the copolymer of hexene-1 and an alpha-olefin is preferably 100/0-50/50.

In the hexene-1 type polymer (a) of the rubber component (A) of this invention, the $C_{3-20}$ alpha-olefin other than hexene-1 is preferably an aliphatic straight chain alpha-olefin or an aliphatic branched alpha-olefin, more preferably a $C_{4-20}$ long chain alpha-olefin, most preferably a $C_{6-12}$ long chain alpha-olefin. Specific examples of the alpha-olefin include propylene, butene-1, pentene-1, 4-methylpentene-1, 4,4-dimethylpentene-1, heptene-1, 4-methylhexene-1, 5-methylhexene-1, 4-methylheptene-1, 5-methylheptene-1, 6-methylheptene-1, 4,4dimethylhexene-1, octene-1, nonene-1, decene-1, 5,6,6-trimethylheptene-1, 5-methylnonene-1, 5,5-dimethyloctene1, undecene-1, dodecene-1, tetradecene-1, hexadecene-1, octadecene-1 and eicosene-1. Preferable of these are butene-1, 4-methylpentene-1, 4-methylhexene-1, octene-1 and decene-1. Particularly preferred are 4-methylhexene-1 and 4-methylpentene-1. These alpha-olefins can be used alone or in combination of two or more.

In this invention, the polystyrene-reduced number average molecular weight of the hexene-1 type polymer (a) is preferably at least 10,000, more preferably at least 30,000, most preferably at least 100,000. When the number average molecular weight is less than 10,000, the hexene-1 type polymer (a) has so high tackiness that its handling becomes very difficult in some cases.

As the hexene-1 type polymer (a), a hexene-¼-methylpentene-1 random copolymer is most preferable which is composed of 65-90% by weight of the following recurring unit (X) and 35-10% by weight of the following recurring unit (Y) and having a polystyrene-reduced number average molecular weight of 20,000 to 500,000:

(X)

(Y)

This copolymer is a novel copolymer.

The hexene-1 content in the above hexene-½-methylpentene-1 random copolymer is 65 to 90% by weight, preferably 65 to 80% by weight, and when the content is less than 65% by weight, the copolymer obtained exhibits crystallinity in some cases, and when it is more than 90% by weight, the vibration-damping capacity of the copolymer becomes low and the rebound resilience of the copolymer becomes large or the tan δ value of the copolymer becomes low.

The hexene-1 content in the hexene-½-methylpentene-1 random copolymer can be determined by an infrared spectroscopic analysis. For example, the ratio of the absorption spectrum of the copolymer at about 730 cm$^{-1}$ to that at about 1,170 cm$^{-1}$ is determined, and the hexene-1 content is then determined by comparing the ratio with the calibration curve previously prepared from sample mixtures of polyhexene-1 and poly(4-methylpentene-1) having known mixing ratios.

The polystyrene-reduced number average molecular weight of the above random copolymer ranges from 20,000 to 500,000, preferably from 30,000 to 200,000, and when it is less than 20,000, the mechanical strength of the copolymer obtained tends to be lowered, and when it is more than 500,000, the workability of the copolymer at the time of handling, for example, roll-windability, tends to become inferior.

The maximum value of endothermic peak of the above random copolymer based on a differential scanning calorimeter (DSC) ranges preferably from −35° C. to −20° C., more preferably from −28° C. to −20° C. When this maximum value is lower than −35° C., the vibration-damping capacity of the copolymer obtained tends to become low, and when it is higher than −20° C. the frequency dependency of the vibration-damping capacity tends to become great.

This maximum value of endothermic peak can be determined in the following manner:

A sample is set on a differential scanning calorimeter (DuPont 990, manufactured by DuPont, U.S.A.), the temperature is elevated to 260° C., and the sample is thereafter gradually cooled to −100° C. at a rate of 10° C./min, after which the temperature is elevated at a rate of 20° C./min. From the melting peak obtained thereby, the peak to value is read and used as the maximum value of endothermic peak.

The structure of the novel hexene-½-methylpentene-1 random copolymer can be confirmed from absorption due to CH$_3$ of the n-butyl group in the hexene-1 unit at about 730 cm$^{-1}$, absorption due to CH$_3$ of the i-butyl group in the 4-methylpentene unit at about 1,170 cm$^{-1}$, absorption due to CH$_3$ of the i-butyl group in the 4-methylpentene unit at about 1,370 cm$^{-1}$ and the like in the infrared absorption spectrum of the copolymer, and the composition ratio can be confirmed from the calibration curves of the infrared absorption spectrum as mentioned above.

The hexene-1 type copolymer (a) of the rubber component (A) in this invention can be produced by, for example, copolymerizing hexene-1 with a C$_{3-20}$alpha-olefin other than hexene-1 in the presence of a Ziegler-Natta catalyst at a temperature of 0–200° C., preferably 20°–150° C., under a pressure of 0–150 kg/cm$^2$·G, preferably 0–50 kg/cm$^2$·G (G: gauge pressure) for a period of 0.1–3 hours, preferably 0.5–2 hours.

The Ziegler-Natta catalyst used in the production of the hexene-1 type copolymer (a) may be any Ziegler-Natta catalyst in which the transition metal component is a titanium compound or its composition, and a heretofore known titanium compound may be used as the transition metal component.

Examples of the titanium compound or its composition include (1) titanium halide compounds such as titanium tetrachloride, titanium trichloride or its composition, for example, TiCl$_3$-nAlCl$_3$, titanium dichloride or its composition, and the like; and (2) so-called carrier-supported catalyst components in which a titanium compound such as titanium tetrachloride, ethoxytitanium trichloride, titanium trichloride, tetrabutoxytitanium or the like is supported on a carrier [the carrier means herein not only compounds which act as merely carriers, but also compounds which form complicated complexes with the titanium compounds and other optional components and act delicately on the polymerization activity, stereo-regularity, molecular weight distribution and the like, such as silica, alumina, silica-alumina, titania, magnesia, magnesium chloride or its composition (for example, composition of magnesium chloride and Lewis acid), magnesium oxychloride, reaction product of magnesium oxychloride with an alkylaluminum dichloride]with or without an electron-donating compound such as an organic acid ester, water, an amine, an ether or the like.

The composition of the titanium compound consists mainly of the above titanium compound, and includes usually compositions containing the titanium compound and not more than 30% by weight, based on the weight of the titanium compound, of an alkylaluminum monohalide and/or a Lewis acid (for example, aluminum chloride, antimony trichloride, phosphorus halide compounds or the like) and/or an electron donor (for example, an ether, an organic acid ester, an organic acid amide, a phosphoric acid amide, an amine, a phosphine and the like). and also includes the above-mentioned carrier-supported components.

The titanium compound or its composition used is preferably titanium tetrachloride; titanium trichloride obtained by reducing titanium tetrachloride with a reducing agent such as hydrogen, aluminum, titanium an organoaluminum or the like or a titanium trichloride composition, for example, TiCl$_3$-nAlCl$_3$; a titanium trichloride composition obtained by co-grinding the titanium trichloride (or its composition) with an electron donor such as an organic acid ester, an ether, a phosphoric acid amide or the like; a titanium trichloride composition obtained by reducing titanium tetrachloride with an organoaluminum and then treating the reduction product with an ether or a Lewis acid; a reaction product of magnesium oxychloride with an alkylaluminum dichloride, which product may optionally be reacted with a siloxane compound; or a carrier-supported catalyst component in which the carrier is magnesium chloride and has supported thereon an electron donor such as an organic acid ester, an alcohol, an amine, an organic acid amide, an ether or water and a halogen-containing titanium compound such as titanium tetrachloride, titanium trichloride, an alkoxytitanium trichloride or the like as an essential component.

On the other hand, the organometal compound component which is the other component of the Ziegler-Natta catalyst, are appropriately organometal compounds of metals of Groups I to III of the Periodic Table, among which organoaluminum compounds are particularly preferred. Usually, examples of organoaluminum compounds which are preferably used include (i) trialkylaluminums such as trimethylaluminum, triethylaluminum, triisobutyl-aluminum, tri-n-hexylaluminum and the like; (ii) dialkyl-aluminum halides such as diethylaluminum chloride, di-n-propylaluminum chloride, diisobutylaluminum chloride and the like; (iii) dialkylaluminum hydrides such as diethylaluminum hydride, diisobutylaluminum hydride and the like; (iv) alkylaluminum sesquichlorides such as methylaluminum sesquichloride, ethylaluminum sesquichloride, n-propylaluminum sesquichloride, isobutylaluminum sesquichloride and the like; (v) alkylaluminum dihalides such as methylaluminum dichloride, ethylaluminum dichloride, isopropylaluminum dichloride and the like; (vi) dialkylaluminum alkoxides and aryloxides such as diethylaluminum ethoxide, diethylaluminum isopropoxide, di-n-propylaluminum 2,6-di-t-butylphenoxide and the like; and (vii) dimethylaluminum trimethylsiloxide, diethylaluminum trimethylsiloxide and the like. Alternatively, reaction products of these organoaluminums with water, secondary amines or organic acid esters may be used in place thereof. These organoaluminum compounds may be used alone or in admixture of two or more.

The composition ratio of the above catalyst is not critical, and usually such that the proportion of the organometallic compound is 0.1–2,000 moles, preferably 0.5–1,000 moles, more preferably 1–500 moles, per one atom of titanium. The amount of the electron donor used as the optional third component of the catalyst is usually about 0.01–1 mole per mole of the organometallic compound.

The amount of the catalyst used is usually 0.003 to 0.5 millimole, preferably about 0.005 to 0.02 millimole, per mole of the total monomer.

The polymerization manner is not critical and there may be used (I) a slurry or solution method using an inert solvent such as n-hexane, n-heptane, n-octane or the like and (II) a slurry or melt method in which substantially no solvent is used and hexene-1 and $C_{3-20}$alphaolefins other than hexene-1 act as a solvent.

The copolymerization may be effected in the presence of a molecular weight regulator, and as the molecular weight regulator, hydrogen and/or an alkylzinc compound may be used.

When it is intended to produce an elastomeric polymer of long-chain olefins having a high number-average molecular weight, a narrow molecular weight distrubtion, an excellent vibration-damping capacity, and an excellent processability in a short polymerization time, it is preferred that a magnesium chloride-supported titanium compound be used as the transition metal component and a trialkyl aluminum be used as the organoaluminum component and that the Al/Ti molar ratio be controlled to not more than 50 and the monomers/Ti molar ratio be controlled to at least 15,000. When hexene-1 is copolymerized with a $C_{6-20}$alpha-olefin, a polymer having such a narrow molecular weight distribution that the Mw/Mn ratio is not more than 10 can be produced in a short polymerization time.

When the catalyst used for this purpose has an Al/Ti molar ratio of more than 50, the amount of the low molecular weight component becomes increased and the molecular weight distribution becomes broad. The Al/Ti molar ratio is more preferably 3–50, most preferably 10–40. When the monomers/Ti molar ratio is less than 15,000, the resulting polymer tends to have a low molecular weight and the tackiness during handling becomes very high. This ratio is more preferably 16,000–50,000.

On the other hand, the $C_{3-20}$alpha-olefin other than hexene-1 for use in the graft copolymer (b) of the rubber component (A) can be selected from those alpha-olefins described above in detail with respect to the hexene-1 type polymer (a). Also, the polymerization conditions and catalysts employed for obtaining a copolymer of hexene-1 and a silane compound of the general formula I and a terpolymer of hexene-1, a $C_{3-20}$alpha-olefin other than hexene-1 and a silane compound of the general formula I are the same as those described above in detail with respect to the hexene-1 type polymer (a).

The graft copolymer (b) of the rubber component (A) in this invention is novel and can be obtained in a dry state by such a method that in the copolymerization reaction for producing a copolymer of hexene-1 and a silane compound of the general formula I or a terpolymer of hexene-1, a $C_{3-20}$alpha-olefin other than hexene-1 and a silane compound of the general formula I, a hydroxyl group containing polysiloxane is added to the reaction system when the conversion of the above copolymerization reaction has reached a sufficiently high level, for example, 30–100%, the resulting mixture is stirred at room temperature for one hour to allow the graft reaction to proceed, the catalyst is deactivated with a polymerization terminater to terminate the graft reaction, and the reaction mixture is subjected to methanol coagulation and roll-drying.

As the polymerization terminater, there can be used a $C_{1-10}$alcohol such as methyl alcohol, ethyl alcohol, isopropyl alcohol, butyl alcohol, hexyl alcohol, octyl alcohol or the like. Preferably, the alcohol is used after purification by dehydration.

In this invention, the hexene-1 content in the graft copolymer (b) is preferably at least 30% by weight, particularly preferably at least 50% by weight.

The silane compound of the general formula I used in this invention includes, for example, (2-propenyl)dimethylchlorosilane, (3-butenyl)dimethylchlorosilane, (4pentenyl)dimethylchlorosilane, (5-hexenyl)dimethylchlorosilane, (6-heptenyl)dimethylchlorosilane, (7-octenyl)dimethylchlorosilane, (2-propenyl)methyldichlorosilane, (3butenyl)methyldichlorosilane, (4-pentenyl)methyldichlorosilane, (5-hexenyl)methyldichlorosilane, (6-pentenyl)dimethylchlorosilane, (7-octenyl)methyldichlorosilane, (2-propenyl)trichlorosilane, (3-butenyl)trichlorosilane, (4-pentenyl)trichlorosilane, (5-hexenyl)trichlorosilane, (6-heptenyl)trichlorosilane, (7-octenyl)trichlorosilane and the like. Among them, preferred are (5-hexenyl)dimethylchlorosilane and (7-octenyl)dimethylchlorosilane.

It is preferable in view of heat resistance that the silane compound of the general formula I be contained in an amount of 0.1–10% by weight in the copolymer of hexene-1 and said silane compound or in the terpolymer of hexene-1, a $C_{3-20}$alpha-olefin other than hexene-1 and said silane compound.

The hydroxyl group-containing polysiloxane used in this invention may be a commercially available silicone oil having hydroxyl group-modified or carbinol-modified terminals. Specific examples of such a polysiloxane include a polydiphenylsiloxane-terminated silanol, a polydimethylsiloxane-terminated silanol, a polydimethyl- diphenylpolysiloxane-terminated silanol, a polydimethylmethylvinylsiloxane-terminated silanol, a polydimethylsiloxane-terminated carbinol and the like.

The content of the hydroxyl group-containing polysiloxane in the graft copolymer (b) is preferably 0.5–50% by weight, particularly preferably 0.3–10% by weight in view of the heat resistance of the present rubber composition and the mechanical strengths of a vulcanizate. The amount of the hydroxyl group-containing polysiloxane added may be varied depending upon the content of the silane compound of the general formula I in the copolymer though it is preferably 0.5–1 mole per mole of the silane compound of the general formula I in view of the heat resistance and processability required for the present rubber composition. The polystyrene-reduced number average molecular weight of the graft copolymer (b) in this invention is preferably at least 10,000, more preferably at least 30,000. When the number average molecular weight is less than 10,000, the graft copolymer (b) has high tackiness and handling becomes very difficult in some cases.

In the graft copolymer (b) of this invention, the weight ratio of the graft copolymer of a hydroxyl group-containing polysiloxane on a copolymer of hexene-1 and a silane compound of the general formula I to the graft copolymer of a hydroxyl group-containing polysiloxane on a terpolymer of hexene-1, a $C_{3-20}$alpha-olefin other than hexene-1 and a silane compound of the general formula I is preferably 100/0–50/50.

In this invention, the hexene-1 type polymer (a) and the graft copolymer (b), both constituting the rubber component (A), can be used in a wide range from 100/0–0/100 (weight ratio), preferably 95/5–5/95, more preferably 70/30–5/95. This mixing ratio may be varied depending upon the heat resistance required for the present rubber composition. When the graft copolymer (b) is used in a relatively large amount, the heat resistance of the present rubber composition becomes high.

The reinforcing agent (B) used in the present rubber composition includes carbon black, white carbon, basic magnesium carbonate, activated calcium carbonate (i.e. surface-treated calcium carbonate), etc. These substances can be used alone or in combination of two or more. Of these, carbon black is preferred. Particularly, it is preferable to use at least one of the carbon blacks specified by American Society of Testing and Materials (ASTM), i.e., N-330, N-347, N-326, N-351, N-550, N-660, N-770, N-774 and N-724. The reinforcing agent (B) is used in an amount of 5-150, preferably 5-100 parts by weight per 100 parts by weight of the rubber component (A). When the amount is less than 5 parts by weight, the reinforcing effect is insufficient and, when the amount is more than 150 parts by weight, the crosslinked rubber composition tends to have too high hardness.

The softening agent (C) used in this invention includes a paraffinic process oil, a naphthenic process oil, an aromatic process oil, etc. and the paraffinic process oil is preferred. The aromatic process oil may cause bleeding when used in a large amount. These softening agents can be used alone or in combination of two or more. The softening agent is used in an amount of 0–50, preferably 0–25, more preferably 0–20, parts by weight per 100 parts by weight of the rubber component (A). When the amount exceeds 50 parts by weight, the mechanical strengths of the crosslinked rubber composition obtained tend to be lowered.

The rubber composition of this invention may further comprise various additives which are used in conventional rubbers, such as antioxidant, ultraviolet absorber, lubricant, activator and the like.

The crosslinking agent (D) used in the rubber composition of this invention is preferably an organic peroxide such as dicumyl peroxide, 1,3-bis(t-butylperoxyisopropyl)benzene, n-butyl 4,4-bis(t-butylperoxy)valerate or 1,1-bis(t-butylperoxy)-3,3,5-trimethylcyclohexene. The amount of the crosslinking agent (D) used is 0.1–5 parts by weight per 100 parts by weight of the rubber component (A). When the amount is less than 0.1 part by weight, the crosslinking effect is insufficient. When the amount is more than 5 parts by weight, the In this case, it is possible to use a crosslinking aid such as sulfur, p-benzoquinone dioxime, p,p'-dibenzoylquinone dioxime, dinitrosobenzene, ethylene glycol dimethacrylate, triallyl isocyanurate, trimethylolpropane trimethacrylate, liquid polybutadiene, polybutene, polybutadiene resin or the like.

When in the rubber composition of this invention, the rubber component (A) is a polyhexene-1 and/or a copolymer of hexene-1 and a $C_{3-12}$alpha-olefin other than hexene-1 having a hexene-1 content of 65% by weight and the proportion of the reinforcing agent (B) is 5–60 parts by weight per 100 parts by weight of the rubber component (A), a vulcanized rubber composition can be obtained which has a low hardness and is superior in resistance to permanent compression set and vibration-damping capacity. Such a composition is useful as a vibration-damping material for components of acoustic equipment (e.g. player, amplifier, tuner and the like) and office automation equipment (e.g. personal computer, word processor and the like, or as a rubber roll for office equipment, acoustic equipment, camera and farm applicances.

The rubber composition of this invention can be produced by kneading the materials with a conventional rubber mixer such as Banbury mixer, kneader, blender, intermixer, rolls or the like.

DESCRIPTION OF PREFERRED
EMBODIMENTS

This invention is explained in more detail referring to Examples below. However, the Examples are not by way of limitation but by way of illustration.

In the Examples, part and percent are by weight unless otherwise specified.

In the Examples the polystyrene-reduced number average molecular weight was determined as follows according to the method described in Takeuchi, Gel-Permeation Chromatography, published by Maruzen, Japan:

(1) According to a gel permeation chromatography (GPC), the elution volume (EV) of a standard polystyrene having a known molecular weight was measured and a calibration curve between the known molecular weight M and the EV was prepared.

(2) The GPC pattern of a sample was then taken and the EV of the sample was determined, after which the molecular weight of the sample was determined by applying the EV to the calibration curve obtained in (1) above.

In this case, the conditions for preparing a sample and the GPC measurement conditions are as follows:

Sample Preparation (a) In an o-dichlorobenzene solvent was dissolved 2,6-di-t-butyl-p-cresol at a concentration of 0.08%.

(b) The sample was placed in an Erlenmeyer flask together with an o-chlorobenzene solvent so that the concentration of the sample became 0.1%.

(c) The Erlenmeyer flask was heated to 120° C. and the contents of the flask was stirred for about 60 minutes to form a solution.

(d) The resulting solution was subjected to GPC. Incidentally, the solution was automatically filtered through a sintered filter having a pore diameter of 0.5 μm in the GPC apparatus.

GPC measurement conditions (a) Apparatus: Model 150 manufactured by Waters, U.S.A.

(b) Column: Type H manufactured by Toyo Soda Co., Ltd.

(c) Amount of sample: 500 μl.

(d) Temperature: 120° C.

(e) Flow rate: 1 ml/min (f) Number of total theoretical plates of column:

$1 \times 10^4$ to $2 \times 10^4$ (value of measurement with acetone)

The hexene-1 content in the hexene-1 ]type polymer (a) used in this invention was determined by an infrared spectrophotometry. That is, a ratio of the absorption spectrum of the hexene-1 type polymer (a) at about 730 cm$^{-1}$ characteristic absorption spectrum of alpha-olefin is determined and the hexene-1 content corresponding to the ratio is determined from the calibration curve previously prepared using polyhexene-1/poly-αolefin mixture samples having known mixing ratios between the two.

Also, physical properties (under normal conditions) and resistance to compression set were measured according to JIS K6301, and the vibration-insulating characteristics (vibration-damping capacity) were evaluated by measuring tan δ at 20° C. and 15 Hz, E' at 20° C. and 70 Hz and E' at 20° C. and 1 Hz, determining the static viscoelasticity/dynamic viscoelasticity ratio (E' at 70 Hz/E' at 1 Hz) and comparing the ratios and tan δ values obtained.

Physical properties of vulcanizate were measured according to JIS K6301.

EXAMPLE

Catalyst Preparation

Into a stainless steel ball mill which had previously been purged with nitrogen were charged 210 millimoles of mangesium chloride, 105 millimoles of tetrabutoxytitanium and 64 ml of n-hexane, the ball mill was set in a vibrating machine, and the resulting mixture was subjected to grinding at room temperature for 7 hours. After the grinding, the whole contents of the ball mill were withdrawn into a nitrogen-sealed vessel and washed with five 400-ml portions of n-hexane therein, after which 400 ml of n-hexane was charged into the vessel. With stirring, a 1 mole/liter solution of 105 millimoles of diethylaluminum chloride in n-hexane was dropped into the resulting mixture, and the mixture was subjected to reaction at room temperature for 5 hours.

The reaction mixture thus obtained was washed with five 400-ml portions of n-hexane in the vessel, and thereafter, 400 ml of n-hexane was charged into the vessel to form a titanium catalyst suspension. The titanium concentration of the titanium catalyst suspension was 0.04 mole/liter.

Polymerization

Into a 200-ml flask which had previously been purged with nitrogen were charged 50 ml of n-hexane which had been dehydrated and purified by means of a molecular sieve, 8 ml of hexene-1 which had been similarly purified (special grade chemical) and 2 ml of 4-methylpentene-1 which had been similarly purified (special grade chemical), and 2 millimoles of triisobutylaluminum and the above titanium catalyst suspension (0.04 millimole in terms of titanium atom) were then charged thereinto with thorough stirring to start the copolymerization.

The copolymerization was carried out at 30° C. for 30 minutes, and thereafter, 1 ml of i-propyl alcohol was added to the copolymerization mixture to terminate the copolymerization, after which the copolymerization mixture was poured into a large amount of methanol to coagulate the copolymer. The copolymer was taken out and dried in vacuo.

The amount of the copolymer obtained was 2.0 g and the hexene-1 content thereof was 68%. Also, the maximum value of endothermic peak determined by DSC was −23° C., and the polYstyrene-reduced number average molecular weight of the copolymer was 40,000.

EXAMPLE 2

The same procedure as in Example 1 was repeated, except that the amount of triisobutylaluminum was changed to 50 millimoles and 1 millimole of titanium tetrachloride was substituted for the titanium compound, to obtain a copolymer.

The amount of the copolymer obtained was 0.26 g and the hexene-1 content of the copolymer was 72%. Also, the maximum value of endothermic peak of the polymer determined by DSC was −24° C. and the polystyrene-reduced number average molecular weight of the copolymer was 21,000.

EXAMPLE 3

Catalyst Preparation

Into a stainless steel ball mill which had previously been purged with nitrogen were charged 100 millimoles of magnesium chloride, 7.5 millimoles of ethyl benzoate, 15 millimoles of titanium tetrachloride and 64 ml of n-hexane, the ball mill was set in a vibrating machine, and the resulting mixture was subjected to grinding at room temperature for 7 hours. After the grinding, the whole contents of the ball mill were withdrawn into a nitrogen-sealed vessel, and washed with five 400-ml portions of n-hexane therein. Into the vessel was charged 700 ml of n-hexane to form a titanium catalyst suspension. The titanium concentration of the titanium catalyst suspension thus obtained was 0.02 mole/liter.

Polymerization

The same procedure as in Example 1 was repeated, except that the amount of triisobutylaluminum was changed to 1 millimole and the titanium catalyst suspension prepared above was used in an amount of 0.01 millimole in terms of titanium atom, to obtain a copolymer.

The amount of the copolymer obtained was 2.5 g, and the hexene-1 content of the copolymer was 69%. Also, the maximum value of endothermic peak of the copolymer determined by DSC was -23° C. and the polystyrene-reduced number average molecular weight of the copolymer was 38,000.

EXAMPLE 4

Figure 1:
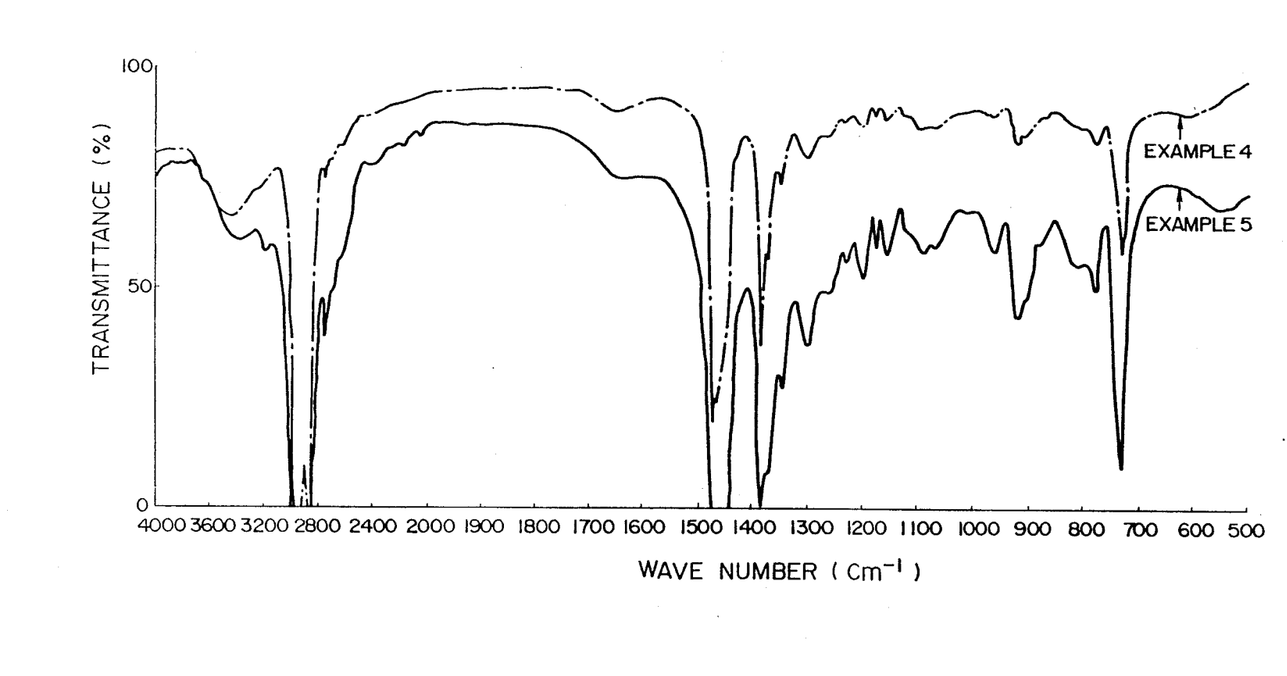
The accompanying drawing shows the infrared absorption spectra of the copolymers of this invention obtained in Examples 4 and 5 which appear hereinafter.

The same procedure as in Example 1 was repeated, except that the amount of hexene-1 was changed to 9 ml and the amount of 4-methylpentene-1 was changed to 1 ml, to obtain a copolymer. The amount of the copolymer obtained was 2.6 g and the hexene-1 content of the copolymer was 78%. Also, the maximum value of exothermic peak of the copolymer determined by DSC was −26° C. and the polystyrene-reduced number average molecular weight of the copolymer was 46,000. Incidentally, the infrared absorption spectrum of the copolymer obtained is shown in the accompanying drawings.

COMPARATIVE EXAMPLE 1

The same procedure as in Example 1 was repeated; except that the amount of hexene-1 was changed to 2.5 ml and the amount of 4-methylpentene-1 was changed to 7.5 ml, to obtain a copolymer. The amount of the copolymer obtained was 1.3 g and the hexene-1 content of the copolymer was 35%.

Also, the maximum value of endothermic peak of the copolymer determined by DSC was 15° C. and the polystyrene-reduced molecular weight of the copolymer was intended to be measured by GPC, but the measurement was impossible because the copolymer was not completely dissolved in o-dichlorobenzene.

COMPARATIVE EXAMPLE 2

The same procedure as in Example 1 was repeated, except that the amount of hexene-1 was changed to 5 ml and the amount of 4-methylpentene-1 was changed to 5 ml, to obtain a copolymer. The amount of the copolymer obtained was 2.4 g and the hexene-1 content of the copolymer was 42%.

Also, the maximum value of endothermic peak of the copolymer determined by DSC was 3° C., and the polystyrene-reduced molecular weight of the copolymer was 40,000.

COMPARATIVE EXAMPLE 3

The same procedure as in Example 1 was repeated, except that the amount of hexene-1 was changed to 1 ml and the amount of 4-methylpentene-1 was changed to 9 ml, to obtain a copolymer. The amount of the copolymer obtained was 1.2 g and the hexene-1 content of the copolymer was 15%.

Also, the maximum value of endothermic peak of the copolymer determined by DSC was 31° C. and the polystyrene-reduced number average molecular weight of the copolymer was intended to be measured by GPC but the measurement was impossible because the copolymer was not completely dissolved in o-chlorobenzene.

EXAMPLE 5

The same procedure as in Example 3 was repeated, except that the amount of hexene-1 was changed to 270 ml, the amount of 4-methylpentene-1 was changed to 30 ml, the amount of n-hexene was changed to 1.5 liters, the amount of the titanium catalyst suspension was changed to 0.25 millimole in terms of titanium atom and the amount of triisobutylaluminum was changed to 25 millimoles, to obtain a copolymer. The amount of the copolymer obtained was 188 g and the hexene-1 content of the copolymer was 71%. Also, the maximum value of endothermic peak of the copolymer determined by DSC was −24° C. and the polystyrenereduced number average molecular weight of the copolymer was 42,000. Incidentally, the infrared absorption spectrum of the copolymer is shown in the accompanying drawings.

COMPARATIVE EXAMPLE 4

The same procedure as in Example 5 was repeated, except that each of the amounts of hexene-1 and 4-methyl- pentene-1 was changed to 150 ml, to obtain a copolymer. The amount of the copolymer obtained was 162 g and the hexene-1 content of the copolymer was 49%.

Also, the maximum value or endothermic peak of the copolymer determined by DSC was −3° C. and the polystyrene-reduced number average molecular weight of the copolymer was 38,000.

COMPARATIVE EXAMPLE 5

The same procedure as in Example 5 was except that the amount of hexene-1 was changed to ml and the 4-methylpentene-1 was not used, to obtain polymer. The amount of the polymer produced was 1 g, the maximum value of endothermic peak of the polymer determined by DSC was −38° C., and the number average molecular weight of the polymer was 50,500.

TEST EXAMPLES 1 to 5

The polymers obtained in Example 5 and Comparative Examples 4 and 5 and butyl rubber (JSR Butyl manufactured by Nippon Butyl Kabushiki Kaisha) were subjected to kneading in a 250-cc plastomill at 60 for 4 minutes with the compounding recipes shown in Ta 1, and cross-linking agents as shown in Table 1 were to the resulting mixtures on 4-inch rolls to prepare compounds:

TABLE 1

| Components (Parts) | Compounding Recipes | | |
|---|---|---|---|
| | Test Ex. 1–3 | Test Ex. 4 | Test Ex. 5 |
| Polymer | 100 | 100 | 100 |
| Zinc white | 5 | 5 | 5 |
| Stearic acid | 1 | 1 | 1 |
| GPF black*1 | 70 | 70 | 100 |
| Paraffinic oil*2 | 25 | 25 | — |
| Cross-linking agents | | | |
| Dicumyl peroxide*3 | 3 | — | 3 |
| Sulfur | 0.3 | 2 | 0.3 |
| Vulcanization Accelerator | | | |
| MBT*4 | — | 0.5 | — |
| TMTD*5 | — | 1 | — |

Note:
*1 Diablack G manufactured by Mitsubishi Chemical Industries, Ltd.
*2 Fuccol P400 manufactured by Fuji Kosan Co., Ltd.
*3 Percumyl D manufactured by Nippon Oil & Fats Co., Ltd.
*4 Mercaptobenzothiazol (Nocceler M manufactured by Ohuchi Shinko Chemical Industry Co., Ltd.)
*5 Tetramethylthiuram disulfide (Nocceler TT manufactured by Ohuchi Shinko Chemical Industry Co., Ltd.)

The compounds thus obtained were press-vulcanized at 160° C. for 30 minutes and subjected to test for physical properties. The results obtained are shown in Table 2. As is clear from Table 2, the polymer obtained in Example 5 (Test Ex. 1 and 5) had a greater tan δ value and a smaller rebound resilience than butyl rubber (Test Ex. 4), and exhibited excellent vibration-damping capacity.

Also, the frequency-dependency (static viscoelectricity/dynamic viscoelectricity ratio) of the polymer obtained in Example 5 was found to be good though it was inferior to that of butyl rubber.

Moreover, in Test Example 2 in which the polymer obtained in Comparative Example 4 was used, the tan δ value was great and the vibration-damping capacity was great, but the frequency-dependency was too large and in Test Example 3 in which the polymer obtained in Comparative Example 5 was used, the tan δ value was small and the vibration-damping capacity was inferior.

TABLE 2

|  | Test Example No. | | | | |
| --- | --- | --- | --- | --- | --- |
|  | 1 | 2 | 3 | 4 | 5 |
| Polymer | Example 5 | Comparative Example 4 | Comparative Example 5 | Butyl rubber | Example 5 |
| Physical properties under normal conditions | | | | | |
| $M_{100}$ (kgf/cm$^2$) | 4 | 10 | 4 | 20 | 39 |
| $T_B$ (kgf/cm$^2$) | 52 | 54 | 50 | 98 | 100 |
| $E_B$ (%) | 630 | 500 | 510 | 530 | 210 |
| $H_S$ (JIS A) | 28 | 33 | 28 | 56 | 63 |
| Rebound resilience at 23° C. (%) | 10 | 8 | 14 | 16 | 8 |
| Vibration-insulating properties | | | | | |
| tan δ (20° C., 15 Hz) | 0.493 | 0.521 | 0.376 | 0.315 | 0.464 |
| E' at 70 Hz (dyn/cm$^2$) | $5.63 \times 10^7$ | $9.42 \times 10^7$ | $4.35 \times 10^7$ | $1.18 \times 10^8$ | $2.87 \times 10^8$ |
| E' at 1 Hz (dyn/cm$^2$) | $3.16 \times 10^7$ | $3.77 \times 10^7$ | $2.57 \times 10^7$ | $7.60 \times 10^8$ | $1.51 \times 10^8$ |
| Static viscoelasticity/ dynamic viscoelasticity (E' at 70 Hz/E' at 1 Hz) | 1.78 | 2.50 | 1.69 | 1.55 | 1.90 |

EXAMPLE 6

Catalyst Preparation

Into a stainless steel ball mill which had previously been purged with nitrogen were charged 210 millimoles of magnesium chloride, 105 millimoles of tetrabutoxytitanium and 64 ml of n-hexane, the ball mill was set in a vibrating machine, and the mixture in the ball mill was subjected to grinding at room temperature for 7 hours. After the grinding, the whole contents of the ball mill were withdrawn into a nitrogen-sealed vessel and washed with five 400-ml portions of n-hexane therein, after which 400 ml of n-hexane was charged into the vessel. With stirring, a 1 mole/liter solution of 105 millimoles of diethylaluminum chloride in n-hexane was dropped into the resulting mixture, and the mixture was subjected to reaction at room temperature for 5 hours.

The reaction mixture thus obtained was washed with five 400-ml portions of n-hexane in the vessel, and thereafter, 400 ml of n-hexane was charged into the vessel to form a titanium catalyst suspension. The titanium concentration of the titanium catalyst suspension was 0.04 mole/liter.

Polymerization

Into a 5-liter flask which had previously been purged with nitrogen were charged 3 liters of n-hexane which had been dehydrated and purified by means of a molecular sieve, 180 ml of hexene-1 which had been similarly purified (special grade chemical) and 20 ml of 4-methylpentene-1 which had been similarly purified (special grade chemical). Into the flask were further charged with sufficient stirring 25 millimoles of triisobutylaluminum and 0.5 millimole (in terms of titanium atom) of the titanium catalyst suspension obtained above, to start copolymerization.

The copolymerization was carried out at 30° C. for 120 minutes, and thereafter, 5 ml of isopropyl alcohol was added to the copolymerization mixture to terminate the copolymerization. Then, the whole mixture was poured into a large amount of methanol to coagulate the copolymer formed. The copolymer was taken out and dried in vacuo. The amount of the copolymer obtained was 112 g, the hexene-1 content of the copolymer was 81%, and the poly- styrene-reduced number average molecular weight of the copolymer was 49,000.

Evaluation of Physical Properties

With the compounding recipe shown in Table 3, the copolymer obtained above was subjected to kneading in a 250-cc plastomill for 4 minutes at 70° C. Then, a crosslinking agent and a crosslinking aid were added and the whole mixture was kneaded by 4-inch rolls to obtain a rubber composition.

TABLE 3

| Components | Amounts mixed | Kneading method |
| --- | --- | --- |
| Copolymer | 100 parts | Plastomill |
| GPF carbon*$^1$ | 95 parts | |
| Paraffinic oil*$^2$ | 5 parts | |
| Zinc white | 5 parts | |
| Stearic acid | 1 part | |
| Dicumyl peroxide*$^3$ | 3 parts | Rolls |
| Sulfur | 0.3 part | |

*$^1$Diablack G manufactured by Mitsubishi Chemical Industries, Ltd.
*$^2$Fuccol P400 manufactured by Fuji Kòsan Co., Ltd.
*$^3$Percumyl D manufactured by Nippon Oil & Fats Co., Ltd.

The rubber composition obtained above was press-vulcanized at 160° C. for 35 minutes and then molded into a sheet. The sheet was measured for physical properties. The results are shown in Table 4.

TABLE 4

|  | Example 6 | Comparative Example 6 | Example 7 | Example 8 | Example 9 | Example 10 |
| --- | --- | --- | --- | --- | --- | --- |
| Physical properties under normal conditions | | | | | | |

TABLE 4-continued

|  | Example 6 | Comparative Example 6 | Example 7 | Example 8 | Example 9 | Example 10 |
|---|---|---|---|---|---|---|
| $M_{100}$ (kgf/cm$^2$) | 32 | 17 | 35 | 37 | 30 | 29 |
| $T_B$ (kgf/cm$^2$) | 115 | 125 | 113 | 120 | 110 | 110 |
| $E_B$ (%) | 260 | 600 | 240 | 290 | 200 | 300 |
| $H_S$ (JIS A) | 59 | 53 | 60 | 69 | 58 | 57 |
| Rebound resilience at 23° C. (%) | 10 | 14 | 12 | 7 | 11 | 11 |
| Vibration-insulating properties |  |  |  |  |  |  |
| tan δ (20° C., 15 HZ) | 0.456 | 0.355 | 0.446 | 0.579 | 0.436 | 0.450 |
| E' at 70 HZ (dyn/cm$^2$) | $1.84 \times 10^8$ | $1.20 \times 10^8$ | $1.75 \times 10^8$ | $3.44 \times 10^8$ | $1.91 \times 10^8$ | $1.80 \times 10^8$ |
| E' at 1 HZ (dyn/cm$^2$) | $9.91 \times 10^7$ | $7.30 \times 10^7$ | $9.80 \times 10^7$ | $1.50 \times 10^8$ | $1.00 \times 10^7$ | $1.0 \times 10^8$ |
| Static viscoelasticity/ dynamic viscoelasticity (E' at 70 HZ/E' at 1 HZ) | 1.86 | 1.64 | 1.79 | 2.29 | 1.91 | 1.80 |
| Heat aging resistance (gear oven, 175° C. × 72 hr) |  |  |  |  |  |  |
| Ac ($T_B$) (%) | −80 | Impossible to measure owing to melting | −85 | −75 | −83 | −69 |
| Ac ($E_B$) (%) | −10 |  | +18 | −12 | −15 | −61 |
| Ah (JIS A) | +4 |  | +3 | +3 | +4 | +13 |

Note:
$M_{100}$ (kgf/cm$^2$): 100% modulus,
$T_B$ (kgf/cm$^2$): Tensile strength
$E_B$ (%): Elongation
$H_S$ (JIS A): Hardness
Ac ($T_B$) (%): Change after heat aging,
Ah (JIS A): Hardness change after heat aging As is clear from Table 4, the rubber composition of Example 6 had a large tan δ value and exhibited excellent vibration-damping capacity. Also, the static viscoelasticity/dynamic viscoelasticity ratio (frequencydependency) was relatively small, namely good.

COMPARATIVE EXAMPLE 6

With the compounding recipe shown in Table 5, butyl rubber (JSR Butyl 268 manufactured by Nippon Butyl Kabushiki Kaisha) was subjected to kneading, vulcanization and evaluation of physical properties in the same manner as in Example 6. The results are shown in Table 4. As is clear from Table 4, the butyl rubber composition obtained had a small tan δ value and was inferior in vibrationdamping capacity.

TABLE 5

| Components | Amounts mixed |
|---|---|
| Butyl rubber | 100 parts |
| GPF carbon*$^1$ | 75 parts |
| Paraffinic oil*$^2$ | 25 parts |
| Zinc white No. 1 | 5 parts |
| Stearic acid | 1 part |
| Sulfur | 2 parts |
| Vulcanization accelerator MTB*$^4$ | 0.5 part |
| Vulcanization accelerator TMTD*$^5$ | 1 part |

Note:
*$^4$Mercaptobenzothiazole (Nocceler M manufactured by Ohuchi Shinko Chemical Industry Co., Ltd.)
*$^5$Tetramethylthiuram disulfide (Nocceler TT manufactured by Ohuchi Shinko Chemical Industry Co., Ltd.)
*$^1$ and *$^2$ are the same as in Table 3.

EXAMPLE 7

Polymerization was conducted in the same manner as in Example 6, except that the amount of hexene-1 was changed to 200 ml and no 4-methylpentene-1 was used. The amount of the polymer obtained was 115 g and the number average molecular weight thereof was 65,000.

The polymer was subjected to kneading, vulcanization and evaluation of physical properties in the same manner as in Example 6. The results are shown in Table 4, from which it is scan that the vibration-damping capacity was excellent.

EXAMPLE 8

Polymerization was conducted in the same manner as in Example 6, except that each of the amounts of hexene-1 and 4-methylpentene-1 was changed to 100 ml. The amount of the copolymer obtained was 116 g, the hexene-1 content of the copolymer was 47%, and the polystyrenereduced number average molecular weight of the copolymer was 82,000.

The copolymer was subjected to kneading, vulcanization and evaluation of physical properties in the same manner as in Example 6. The results are shown in Table 4, from which it is seen that the tan 6 value was very great, the vibration-damping capacity was excellent and the frequency-dependency was great.

EXAMPLE 9

Polymerization was conducted in the same manner as in Example 6, except that the amount of hexene-1 was changed to 180 ml and 20 ml of butene-1 was used in place of the 4-methylpentene-1. The amount of the copolymer obtained was 121 g, the hexene-1 content of the copolymer was 76%, and the polystyrene-reduced number average molecular weight of the copolymer was 53,000.

The copolymer was subjected to kneading, vulcanization and evaluation of physical properties in the same manner as in Example 6. The results are shown in Table 4, from which it is seen that vibration-damping capacity was excellent.

EXAMPLE 10

Polymerization was conducted in the same manner as in Example 6, except that 200 ml of hexene-1 and 1 ml of 7-octenyldimethylchlorosilane were used as the monomers. Then, to the polymerization mixture was added 2.5 ml of a silicone oil having silanol-modified terminals (XF 40-518 manufactured by TOSHIBA SILICONE K. K.), and stirring was conducted for 1 hour. Subsequently, 5 ml of dehydrated methanol was added to deactivate the catalyst. The mixture was subjected to methanol coagulation and the graft copolymer formed was taken out and dried on rolls at 100° C. The yield of the graft copolymer was 121 g and the silicone oil content of the graft copolymer was 1.3%.

The evaluation of physical properties was conducted in the same manner as in Example 6, except that 50 parts of the above graft copolymer and 50 parts of the copolymer obtained in Example 6 were substituted for the 100 parts of copolymer. The results are shown in Table 3. The composition obtained showed excellent vibration-damping capacity.

EXAMPLE 11

Catalyst Preparation

Into a stainless steel ball mill which had previously been purged with nitrogen were charged 210 millimoles of magnesium chloride, 105 millimoles of tetrabutoxytitanium and 64 ml of n-hexane, the ball mill was set in a vibrating machine, and the resulting mixture was subjected to grinding at room temperature for 7 hours. After the grinding, the whole contents of the ball mill were withdrawn into a nitrogen-sealed vessel and washed with five 400-ml portions of n-hexane therein, after which 400 ml of n-hexane was charged into the vessel. With stirring, a 1 mole/liter solution of 105 millimoles of diethylaluminum chloride in n-hexane was dropped into the resulting mixture, and the mixture was subjected to reaction at room temperature for 5 hours.

The reaction mixture thus obtained was washed with five 400-ml portions of n-hexane in the vessel, and thereafter, 400 ml of n-hexane was charged into the vessel to form a titanium catalyst slurry. The titanium concentration of the titanium catalyst slurry was 0.04 mole/liter. This slurry is hereinafter referred to as the Ti Catalyst 1.

Polymerization

Into a 5-liter separable flask which had previously been purged with nitrogen were charged 3 liters of n-hexane which had been dehydrated and purified by means of a molecular sieve and 300 ml of hexene-1 which had been similarly purified (Dialene-6 manufactured by Mitsubishi Chemical Industries, Ltd.). Into the vessel were further charged with sufficient stirring 15 millimoles of triisobutylaluminum and 0.75 millimole (in terms of titanium atom) of the Ti Catalyst 1 obtained above, and polymerization was effected at 20° C. for 60 minutes. Thereafter, 10 ml of isopropyl alcohol was added to the polymerization mixture to terminate the polymerization. Steam was blown into the resulting polymerization mixture to remove the solvent. The residue was wounded around hot rolls at 100° C. and dried.

The amount of the polymer obtained was 85.2 g and the polystyrene-reduced number average molecular weight of the polymer was 102,000. This polymer is hereinafter referred to as the PH-1.

Evaluation of Physical Properties

With the compounding recipe shown in Table 6, the polyhexene (the PH-1) obtained above was subjected to kneading in a 250-cc plastomill for 4 minutes at 70° C. Then, 3 parts of dicumyl peroxide and 0.3 part of sulfur were added to the rubber composition obtained on 4-inch rolls. This rubber composition was press-vulcanized at 160° C. for 25 minutes and then tested for physical properties. The results are shown in Table 7.

The rubber composition after vulcanization, although it had a low hardness, had a small permanent compression set and a large tan δ value and showed excellent vibration-damping capacity.

TABLE 6

| Components | Amounts used |
|---|---|
| Polymer | 100 parts |
| FEF black*1 | 35 parts |
| Aromatic oil*2 | 5 parts |
| Zinc white | 3 parts |
| Stearic acid | 2 parts |

Note:
*1Asahi #60 manufactured by Asahi Carbon
*2Aromax #3 manufactured by Fuji Kosan Co., Ltd.

COMPARATIVE EXAMPLE 7

Butyl rubber (JSR IIR268 manufactured by Nippon Butyl Kabushiki Kaisha) was subjected to kneading, vulcanization and evaluation of physical properties in the same manner as in Example 11, except that 0.5 part of MBT (vulcanization accelerator), 1 part of TMTD (vulcanization accelerator) and 2 parts of sulfur were used as the vulcanization system and the press vulcanization was effected at 160° C. for 40 minutes. The results are shown in Table 7. The butyl rubber composition obtained, as compared with the rubber composition of Example 11, had a high hardness, a large compression set, a slightly small tan δ value and inferior vibration-damping capacity.

TABLE 7

|  | Example 11 | Example 12 | Example 13 | Example 14 | Example 15 | Comp. Ex. 7 | Example 16 | Example 17 |
|---|---|---|---|---|---|---|---|---|
| Physical properties under normal conditions |  |  |  |  |  |  |  |  |
| $M_{100}$ (kgf/cm$^2$) | 13 | 15 | 56 | 38 | 42 | 29 | 70 | 8 |
| $T_B$ (kgf/cm$^2$) | 100 | 91 | 105 | 101 | 95 | 133 | 110 | 51 |
| $E_B$ (%) | 500 | 570 | 340 | 420 | 450 | 610 | 260 | 510 |
| $H_S$ (JIS-A) | 30 | 31 | 47 | 42 | 45 | 54 | 57 | 28 |
| Compression set (25% compression, 100° C. × 22 hr) |  |  |  |  |  |  |  |  |
| CS (%) | 15 | 16 | 12 | 14 | 15 | 62 | 10 | 25 |
| Vibration-insulating properties |  |  |  |  |  |  |  |  |
| tan δ (25° C., 10 HZ) | 0.290 | 0.275 | 0.272 | 0.276 | 0.270 | 0.250 | 0.262 | 0.251 |

Note:
$M_{100}$ (kgf/cm$^2$): 100% modulus
$T_B$ (kgf/cm$^2$): Tensile strength
$E_B$ (%): Elongation
$H_S$ (JIS-A): Hardness

EXAMPLE 12

Catalyst Preparation

Into a stainless steel ball mill which had previously been purged with nitrogen were charged 100 millimoles of magnesium chloride, 7.5 millimoles of ethyl benzoate, 15 millimoles of titanium tetrachloride and 64 ml of n-hexane, the ball mill was set in a vibrating machine, and the mixture in the ball mill was subjected to grinding at room temperature for 7 hours. After the grinding, the whole contents of the ball mill were withdrawn into a nitrogen-sealed vessel and washed with five 400-ml portions of n-hexane therein, after which 700 ml of n-hexane was charged into the vessel to obtain a titanium catalyst slurry. The titanium concentration of the titanium catalyst slurry was 0.2 mole/liter. This slurry is hereinafter referred to as the Ti catalyst 2.

Polymerization

Polymerization was conducted in the same manner as in Example 11, except that the amount of triisobutylaluminum was changed to 7.5 millimoles and 0.15 millimole of the Ti Catalyst 2 obtained above was used as the titanium catalyst, to obtain a polymer. The amount of the polymer obtained was 71.5 g and the polystyrene-reduced number average molecular weight of the polymer was 263,000. This polymer is hereinafter referred to as the PH-2.

Evaluation of Physical Properties

The PH-2 was subjected to kneading, vulcanization and evaluation of physical properties in the same manner as in Example 11. The results are shown in Table 7. The rubber composition obtained had a low hardness, a small compression set, a large tan δ value and excellent vibration-damping capacity.

EXAMPLE 13 to 15

With the compounding recipes of Examples 13 to 15 shown in Table 8, the polymer (the PH-2) obtained in Example 12 was subjected to kneading, vulcanization and evaluation of physical properties in the same manner as in Example 11. The results are shown in Table 7. Each of the rubber compositions obtained had a low hardness, a small compression set, a large tan δ value and excellent vibration-damping capacity.

TABLE 8

| Components | Example 13 | Example 14 | Example 15 |
|---|---|---|---|
| Polymer | 100 | 100 | 100 |
| FEF carbon*1 | 50 | 50 | 60 |
| Aromatic oil*2 | — | 10 | — |
| Paraffinic oil*3 | — | — | 15 |
| Zinc white | 3 | 3 | 5 |
| Stearic acid | 2 | 2 | 1 |

Note:
*1Asahi #60 manufactured by Asahi Carbon
*2Aromax #3 manufactured by Fuji Kosan Co., Ltd.
*3Fuccol P400 manufactured by Fuji Kosan Co., Ltd.

EXAMPLE 16 and 17

With the compounding recipes of Examples 16 and 17 shown in Table 9, the polymer (the PH-2) obtained in Example 12 was subjected to kneading, vulcanization and evaluation of physical properties in the same manner as in Example 11. The results are shown in Table 7. As is clear from Table 7, when the amount of a rubber reinforcing agent is more than 60 parts or when the amount of a softening agent for rubber is more than 20 parts per 100 parts of the rubber component (A), it becomes impossible to obtain a low hardness vulcanized rubber composition having resistance to compression set.

TABLE 9

| Components | Example 16 | Example 17 |
|---|---|---|
| Polymer | 100 | 100 |
| FEF carbon*1 | 70 | — |
| GPF black*3 | — | 70 |
| Paraffinic oil*2 | — | 25 |
| Zinc white | 3 | 5 |
| Stearic acid | 2 | 1 |

Note:
*1Asahi #60 manufactured by Asahi Carbon
*2Fuccol P400 manufactured by Fuji Kosan Co., Ltd.
*3Diablack G manufactured by Mitsubishi Chemical Industries, Ltd.

EXAMPLE 18

Catalyst Preparation

Into a stainless steel ball mill which had previously been purged with nitrogen were charged 210 millimoles of magnesium chloride, 105 millimoles of tetrabutoxytitanium and 64 ml of n-hexane, the ball mill was set in a vibrating machine, and the mixture in the ball mill was subjected to grinding at room temperature for 7 hours. After the grinding, the whole contents of the ball mill were withdrawn into a nitrogen-sealed vessel and washed with five 400-ml portions of n-hexane therein, after which 400 ml of n-hexane was charged into the vessel. With stirring, a 1 mole/liter solution of 105 millimoles of diethylaluminum chloride in n-hexane was dropped into the resulting mixture, and the mixture was subjected to reaction at room temperature for 5 hours.

The reaction mixture thus obtained was washed with five 400-ml portions of n-hexane in the vessel, and thereafter, 400 ml of n-hexane was charged into the vessel to form a supported titanium catalyst suspension. The titanium concentration of the supported titanium catalyst suspension was 0.04 mole/liter.

Polymerization

Into a 5-liter separable flask which had previously been purged with nitrogen were charged 3 liters of n-hexane which had been dehydrated and purified by means of a molecular sieve and 300 ml of hexene-1 which had been similarly purified (Dialene-6 manufactured by Mitsubishi Chemical Industries, Ltd.). Into the flask were further charged with sufficient stirring 3 millimoles of triisobutylaluminum and 0.12 millimole (in terms of titanium atom) of the supported titanium catalyst suspension obtained above. Then, polymerization was conducted at 30° C. for 30 minutes. The amount of the polymer obtained was 6.1 g, the polystyrene-reduced number average molecular weight (Mn) and the weight average molecular weight (Mw) of the polymer were 102,000 and 936,000, respectively, and the Mw/Mn of the polymer was 9.1. These results are shown in Table 10. As is clear from Table 10, the polymer obtained had a Mn of more than 100,000 and a narrow molecular weight distribution.

TABLE 10

|  | Example 18 | Example 19 | Example 20 | Example 21 | Example 22 |
|---|---|---|---|---|---|
| Monomer (moles) | 2.4 | 2.4 | 2.4 | 2.4 | 2.4 |
| Ti (millimoles) | 0.12 | 3 | 0.15 | 0.2 | 0.15 |
| Al (millimoles) | 3 | 150 | 7.5 | 7.5 | 15 |
| Al/Ti (mole/mole) | 25 | 50 | 50 | 37.5 | 100 |
| Monomer/Ti (mole/mole) | 20,000 | 8,000 | 16,000 | 12,000 | 16,000 |
| Polymerization temperature (°C.) | 30 | 30 | 40 | 60 | 20 |
| Polymerization time (min) | 30 | 30 | 60 | 60 | 60 |
| Polymer yield (g) | 6.1 | 1.0 | 93.0 | 83.0 | 164.0 |
| Mn ($\times 10^{-4}$) | 10.2 | 2.1 | 10.4 | 5.9 | 6.3 |
| Mw ($\times 10^{-4}$) | 93.6 | 55.2 | 96.8 | 50.8 | 66.7 |
| Mw/Mn | 9.1 | 26.3 | 9.3 | 8.6 | 10.6 |

EXAMPLE 19

Polymerization was conducted in the same manner as in Example 18, except that 3 millimoles of titanium tetrachloride was used as the titanium catalyst component and 150 millimoles of triisobutylaluminum was used as the organoaluminum component. The amount of the polymer obtained was about 1 g, the polystyrene-reduced number average molecular weight (Mn) and the weight average molecular weight (Mw) of the polymer were 21,000 and 552,000, respectively, and the Mw/Mn of the polymer was 26.3. These results are shown in Table 10. As is clear from Table 10, the polymer had a smaller Mn and a broader molecular weight distribution than in Example 18.

EXAMPLE 20

Catalyst Preparation

Into a stainless steel ball mill which had previously been purged with nitrogen were charged 100 millimoles of magnesium chloride, 7.5 millimoles of ethyl benzoate, 15 millimoles of titanium tetrachloride and 64 ml of n-hexane, the ball mill was set in a vibrating machine and the mixture in the ball mill was subjected to grinding at room temperature for 7 hours. After the grinding, the whole contents of the ball mill were withdrawn into a nitrogen-sealed vessel and washed with five 400-ml portions of n-hexane therein, after which 700 ml of n-hexane was charged into the vessel to obtain a supported titanium catalyst suspension. The titanium concentration of the supported titanium catalyst suspension was 0.02 mole/liter.

Polymerization

Polymerization was conducted in the same manner as in Example 18, except that 0.15 millimole of the catalyst prepared in Example 18 was used as the supported titanium catalyst component, 7.5 millimoles of triisobutylaluminum was used as the organoaluminum component and the polymerization temperature and time were 40° C. and 60 minutes, respectively. The amount of the polymer obtained was 93 g, the polystyrene-reduced number average molecular weight (Mn) and the weight average molecular weight (Mw) of the polymer were 104,000 and 968,000, respectively, and the Mw/Mn of the polymer was 9.3. These results are shown in Table 10. As is clear from Table 10, the polymer had a Mn of more than 100,000 and a narrow molecular weight distribution.

EXAMPLE 21

Polymerization was conducted in the same manner as in Example 20, except that the amount of the supported titanium catalyst component was changed to 0.2 millimole and the polymerization temperature was changed to 60° C. The amount of the polymer obtained was 83 g, the poly- styrene-reduced number average molecular weight (Mn) and the weight average molecular weight (Mw) of the polymer were 59,000 and 508,000, respectively, and the Mw/Mn of the polymer was 8.6. These results are shown in Table 10. As is clear from Table 10, the polymer had a realtively narrow molecular weight distribution but a smaller Mn than in Example 20.

EXAMPLE 22

Polymerization was conducted in the same manner as in Example 20, except that the amount of triisobutylaluminum was changed to 15 millimoles and the polymerization temperature was changed to 20° C. The Mn, Mw and Mw/Mn of the polymer obtained were 63,000, 667,000 and 10.6, respectively. These results are shown in Table 10. As is clear from Table 10, the polymer obtained had a relatively narrow molecular weight distribution but a smaller Mn than in Example 20.

TEST EXAMPLES 6 and 7

With the compounding recipes shown in Table 11, the polymer obtained in Example 20 (Test Example 6) and the polymer obtained in Example 22 (Test Example 7) were separately kneaded as follows: The polymer obtained in Example 20 or 22 and the components shown in Table 11 except dicumyl peroxide and sulfur were kneaded in a 250-cc plastomill at 70° C. for 4 minutes, after which dicumyl peroxide and sulfur were added and the whole mixture was kneaded on rolls.

TABLE 11

| Components | Amounts used |
|---|---|
| Polymer | 100 parts |
| Zinc white | 5 parts |
| Stearic acid | 1 part |
| GPF black*[1] | 95 parts |
| Paraffinic oil*[2] | 5 parts |
| Dicumyl peroxide*[3] | 3 parts |
| Sulfur | 0.3 part |

Note:
*[1]Diablack G manufactued by Mitsubishi Chemical Industries, Ltd.
*[2]Fuccol P400 manufactured by Fuji Kosan Co., Ltd.
*[3]Percumyl D manufactured by Nippon Oil & Fats Co., Ltd.

Each of the compositions obtained was vulcanized at 160° C. for 35 minutes and then tested for physical properties. The results are shown in Table 12.

TABLE 12

| | Test Example 6 | Test Example 7 |
|---|---|---|
| Polymer used | Example 20 | Example 22 |
| Physical properties under normal conditions (vulcanization: 160° C. × 35 minutes) | | |
| $M_{100}$ (kgf/cm$^2$) | 34 | 40 |
| $T_B$ (kgf/cm$^2$) | 110 | 104 |
| $E_B$ (%) | 240 | 250 |
| $H_S$ (JIS-A) | 60 | 63 |
| Vibration-insulating properties | | |
| tan δ (20° C., 15 Hz) | 0.442 | 0.414 |
| E' at 20° C., 70 Hz (dyn/cm$^2$) | 2.10 × 10$^8$ | 1.95 × 10$^8$ |
| E' at 20° C., 1 Hz (dyn/cm$^2$) | 1.18 × 10$^8$ | 1.13 × 10$^8$ |
| Static viscoelasticity/ dynamic viscoelasticity (E' at 70 Hz/E' at 1 HZ) | 1.78 | 1.73 |

Note:
$M_{100}$ (kgf/cm$^2$): 100% modulus
$T_B$ (kgf/cm$^2$): Tensile strength
$E_B$ (%): Elongation
$H_S$ (JIS-A): Hardness The composition of Test Example 6 was superior to the composition of Test Example 7 in respect of vibration-damping capacity (namely the tan δ value larger). When adding dicumyl peroxide and sulfur to the polymer mixture on rolls, the composition of Test Example 7 showed severe tackiness to the rolls and accordingly was inferior in handling.

As is appreciated from the above, the composition of a polymer having a Mn of more than 100,000 and a Mw/Mn smaller than 10 shows excellent vibration-damping capacity and excellent processability.

What is claimed is:

1. A vibration-damping rubber composition, comprising:
   (A) about 100 parts by weight of at least one rubber component selected from the group consisting of hexene-1 homopolymers, copolymers of hexene-1 and a C$_{3-20}$ alpha-olefin other than hexene-1 and mixtures thereof wherein said rubber component is produced by polymerization in the presence of a Ziegler-Natta catalyst,
   (B) about 5-150 parts by weight of a reinforcing agent,
   (C) up to about 50 parts by weight of a softening agent, which is a process oil, and
   (D) about 0.1-5 parts by weight of an organic peroxide crosslinking agent, and an effective amount of a crosslinking aid selected from the group consisting of sulfur, p-benzoquinone dioxime, p, p'-dibenzoylquinone dioxime, dinitrosobenzene, ethylene glycol dimethacrylate, triallyl isocyanurate, trimethylolpropane trimethacrylate, liquid polybutadiene, polybutene and polybutadiene resin.

2. The vibration-damping rubber composition according to claim 1, wherein the rubber component polymer (a) is a hexene-1 homopolymer.

3. The vibration-damping rubber composition according to claim 1, wherein the rubber component polymer is a copolymer of hexene-1 and a C$_{3-20}$ alpha-olefin other than hexene-1.

4. The vibration-damping rubber composition according to claim 3, wherein the alpha-olefin is at least one compound selected from the group consisting of butene-1, pentene-1, 4-methylpentene-1, 4,4-dimethylpentene-1, heptene-1, 4-methylhexene-1, 5-methylhexene-1, 4-methylheptene-1, 5-methylheptene-1, 6-methylheptene-1, 4,4-dimethylhexene-1, octene-1, nonene-1, decene-1, 5,6,6-trimethylheptene-1, 5-methylnonene-1, 5,5-dimethyloctene-1, undecene-1, dodecene-1, tetradecene-1, hexadecene-1, octadecene-1 and eicosene-1.

5. The vibration-damping rubber composition according to claim 3, wherein the alpha-olefin is at least one compound selected from the group consisting of butene-1, 4-methylpentene-1, 4-methylhexene-1, octene-1 and decene-1.

6. The vibration-damping rubber composition according to claim 3, wherein the alpha-olefin is 4-methylpentene-1 or 4-methylhexene-1.

7. The vibration-damping rubber composition according to claim 1, wherein the hexene-1 content in the rubber component polymer is at least 30% by weight.

8. The vibration-damping rubber composition according to claim 1, wherein the rubber component polymer contains a hexene-1 homopolymer in a proportion of 100-50% by weight.

9. The vibration-damping rubber composition according to claim 1, wherein the reinforcing agent (B) is carbon black, white carbon, basic magnesium carbonate or activated calcium carbonate.

10. The vibration-damping rubber composition according to claim 1, wherein the process oil (C) is selected from the group consisting of a paraffinic process oil, a naphthenic process oil and an aromatic process oil.

11. The vibration-damping rubber composition according to claim 1, wherein the rubber component is at least one selected from the group consisting of a polyhexene-1 and a copolymer of hexene-1 and a C$_{3-12}$ alpha-olefin other than hexene-1, containing at least 65% by weight of hexene-1 and wherein the proportion of the reinforcing agent (B) is 5-60 parts by weight and the proportion of the softening agent (C) is 0-20 parts by weight.

12. The vibration-damping rubber composition according to claim 1, wherein the rubber component polymer has a polystyrene-reduced number average molecular weight of at least about 10,000.

13. The vibration-damping rubber composition according to claim 12, wherein the rubber component polymer has a polystyrene-reduced number average molecular weight of at least about 30,000.

* * * * *